United States Patent [19]
Edwards et al.

[11] Patent Number: 4,844,560
[45] Date of Patent: Jul. 4, 1989

[54] ENDLESS DRIVE TRACK JOINT ASSEMBLY

[75] Inventors: John W. Edwards, Brandon; Daniel R. Harper; Quinton B. McNew, both of Ft. Myers, all of Fla.

[73] Assignee: Edwards, Harper, McNew & Company, Ft. Myers, Fla.

[21] Appl. No.: 146,187

[22] Filed: Jan. 20, 1988

Related U.S. Application Data

[63] Continuation-in-part of Ser. No. 113,670, Oct. 28, 1987, and a continuation-in-part of Ser. No. 49,819, May 14, 1987, and a continuation-in-part of Ser. No. 51,830, May 20, 1987.

[51] Int. Cl.$^4$ .......................................... B62D 55/205
[52] U.S. Cl. ..................................... 305/35 R; 305/40
[58] Field of Search .................. 305/12, 35 R, 35 EB, 305/37-41, 46, 51, 55, 57, 54; 474/201, 205, 237, 240, 242

[56] References Cited

U.S. PATENT DOCUMENTS

| | | |
|---|---|---|
| 296,998 | 4/1884 | Page . |
| 893,787 | 7/1908 | Conklin . |
| 905,405 | 12/1908 | Britton . |
| 1,217,007 | 2/1917 | Jory . |
| 1,400,100 | 12/1921 | Reddaway . |
| 1,420,531 | 6/1922 | Dutkiewicz et al. . |
| 1,693,833 | 12/1928 | Worley . |
| 1,789,084 | 1/1931 | Schwarz . |
| 1,814,046 | 7/1931 | Kegresse . |
| 1,862,784 | 6/1932 | Choate . |
| 1,898,035 | 2/1933 | Diamond . |
| 1,911,184 | 5/1933 | Flynn . |
| 1,973,214 | 9/1934 | Lamb . |
| 1,975,726 | 10/1934 | Martinage . |
| 2,025,007 | 12/1934 | Wendling . |
| 2,037,983 | 4/1936 | Johnston . |
| 2,116,834 | 5/1938 | Kegresse . |
| 2,290,109 | 7/1942 | Mayne . |
| 2,309,648 | 2/1943 | Kelly . |
| 2,322,466 | 6/1943 | Perry . |
| 2,338,817 | 1/1944 | Mayne . |
| 2,342,953 | 2/1944 | Mayne . |
| 2,345,763 | 4/1944 | Mayne . |
| 2,350,076 | 5/1944 | Smith et al. . |
| 2,374,240 | 4/1945 | Shankman . |
| 2,376,802 | 5/1945 | Morse . |
| 2,385,453 | 9/1945 | Leguillon . |
| 2,387,802 | 10/1945 | Mayne . |
| 2,410,507 | 11/1946 | Knight . |
| 2,412,122 | 12/1946 | Campbell . |

(List continued on next page.)

FOREIGN PATENT DOCUMENTS 922346 3/1973 Canada .
948243 5/1974 Canada .

(List continued on next page.)

OTHER PUBLICATIONS

Fabricon 81 brochure, Vannerflex TM, "Cleated Conveyor Belting For Industry", pp. 1-17, Portland, Oreg.
MacArthur Press (Books) Pty. Ltd., "Blackwoods Gen- (List continued on next page.)

Primary Examiner—Johnny D. Cherry
Assistant Examiner—Russell D. Stormer
Attorney, Agent, or Firm—Oliff & Berridge

[57] ABSTRACT

An assembly for joining ends of a drive track of an endless track drive system includes at least one connector member or connector member belt situated within the endless drive track, one or two retaining rods situated between abutting ends of the endless drive track, and a master link with a one-piece upper part and a one-piece lower part. The connector member(s) or connector member belt(s) is situated within the endless drive track in such a way that substantially parallel lengths of the connector member(s) or connector member belt(s) extend longitudinally of the endless drive track and loops of the connector member(s) or connector member belt(s) extend from ends of the endless drive track. The loops extending from abutting ends of the endless drive track are looped around an individual retaining rod, or two different retaining rods, and the retaining rod(s) and loops are sandwiched between the upper and lower master link parts by means of a fastening device which holds the upper and lower master link parts to one another. The connector member(s)/connector member belt(s) is made of high strength metal or fabric. The simplified, high strength joint assembly can be utilized for interconnecting one or more drive track modules to form an endless drive track.

30 Claims, 7 Drawing Sheets

U.S. PATENT DOCUMENTS

| | | |
|---|---|---|
| 2,449,421 | 9/1948 | Slemmons et al. . |
| 2,476,460 | 7/1949 | Smith . |
| 2,476,828 | 7/1946 | Skromme . |
| 2,487,813 | 11/1949 | Knox . |
| 2,531,111 | 11/1950 | Daniels . |
| 2,537,745 | 1/1951 | Daniels . |
| 2,541,177 | 2/1951 | Slemmons . |
| 2,592,541 | 4/1952 | Curtis . |
| 2,592,916 | 4/1952 | Leguillon ............................... 305/37 |
| 2,608,875 | 9/1952 | Ellison et al. . |
| 2,728,612 | 12/1955 | Howe et al. . |
| 2,732,265 | 1/1956 | Cuthbertson . |
| 2,733,965 | 2/1956 | Gladden . |
| 2,735,728 | 2/1956 | Powell ................................. 305/40 |
| 2,796,303 | 6/1957 | Atkinson . |
| 2,803,504 | 8/1957 | Lynch . |
| 2,823,082 | 2/1958 | Bauer, Jr. . |
| 2,845,308 | 7/1958 | Woltemar . |
| 2,900,210 | 8/1959 | Parsons . |
| 3,013,844 | 12/1961 | Mazzarins . |
| 3,019,062 | 1/1962 | Long . |
| 3,068,711 | 12/1962 | Even . |
| 3,093,006 | 6/1963 | Gamaunt . |
| 3,104,113 | 9/1963 | Montz . |
| 3,105,390 | 10/1963 | Funke et al. . |
| 3,118,709 | 1/1964 | Case . |
| 3,250,577 | 5/1966 | Olson . |
| 3,373,067 | 3/1968 | Hagstrom . |
| 3,439,959 | 4/1969 | Bowen et al. . |
| 3,451,729 | 6/1969 | Bruneau . |
| 3,480,339 | 11/1969 | Kell . |
| 3,484,140 | 12/1969 | Grenier ............................... 305/40 X |
| 3,567,291 | 3/1971 | Paulson . |
| 3,604,763 | 9/1971 | Maguire . |
| 3,606,497 | 9/1971 | Gilles . |
| 3,606,921 | 9/1971 | Grawey . |
| 3,618,384 | 11/1971 | Bierlein . |
| 3,625,574 | 12/1971 | Plastino ................................. 305/40 |
| 3,630,580 | 12/1971 | Grawey et al. . |
| 3,645,586 | 2/1972 | Piepho . |
| 3,703,321 | 11/1972 | Schoonover . |
| 3,717,391 | 2/1973 | Snellman et al. ..................... 305/40 |
| 3,734,576 | 5/1973 | Heiple et al. . |
| 3,734,577 | 5/1973 | Snellman ............................... 305/40 |
| 3,736,032 | 5/1973 | Mosshart et al. . |
| 3,758,171 | 9/1973 | Plastino . |
| 3,771,844 | 11/1973 | Perreault . |
| 3,773,394 | 11/1973 | Grawey . |
| 3,808,901 | 5/1974 | Berg . |
| 3,857,617 | 12/1974 | Grawley . |
| 3,880,478 | 4/1975 | Baylor . |
| 3,888,132 | 6/1975 | Russ, Sr. . |
| 3,899,219 | 8/1975 | Boggs . |
| 3,899,220 | 8/1975 | Grawey et al. . |
| 3,900,231 | 8/1975 | Ohm . |
| 3,943,335 | 12/1888 | Chase . |
| 3,955,855 | 5/1976 | Massieon et al. . |
| 4,023,865 | 5/1977 | Morissette . |
| 4,093,318 | 6/1978 | Edwards . |
| 4,145,092 | 3/1979 | Kasin . |
| 4,175,796 | 11/1979 | Boggs et al. . |
| 4,203,633 | 5/1980 | Hare . |
| 4,217,006 | 8/1980 | Dehnert . |
| 4,278,302 | 7/1981 | Westimayer et al. .......... 305/35 EB |
| 4,281,882 | 8/1981 | van der Lely . |
| 4,349,234 | 9/1982 | Hartmann . |
| 4,362,340 | 12/1982 | van der Lely . |
| 4,365,965 | 12/1982 | Russ, Sr. . |
| 4,410,219 | 10/1983 | van der Lely . |
| 4,448,273 | 5/1984 | Barbieri . |
| 4,449,958 | 5/1984 | Conrad . |
| 4,452,496 | 6/1984 | van der Lely . |
| 4,473,366 | 9/1984 | Cataldo . |
| 4,474,414 | 10/1984 | Tokue ............................ 305/35 EB |
| 4,484,903 | 11/1984 | Schneider . |
| 4,569,561 | 2/1986 | Edwards et al. . |
| 4,579,547 | 4/1986 | McComber et al. . |
| 4,594,846 | 1/1986 | Livesay et al. . |
| 4,595,387 | 6/1986 | Frazier et al. . |
| 4,611,860 | 9/1986 | Wohlford et al. . |
| 4,616,883 | 10/1986 | Edwards et al. . |
| 4,618,190 | 10/1986 | Garman et al. . |
| 4,636,014 | 1/1987 | Dennison et al. . |
| 4,637,665 | 1/1987 | Burdick et al. . |
| 4,642,080 | 2/1987 | Takano et al. . |
| 4,650,444 | 3/1987 | Sakakibara et al. . |

FOREIGN PATENT DOCUMENTS

| | | |
|---|---|---|
| 473073 | 3/1929 | Fed. Rep. of Germany . |
| 1149255 | 12/1960 | Fed. Rep. of Germany . |
| 1918554 | 6/1965 | Fed. Rep. of Germany . |
| 710824 | 10/1931 | France . |
| 2378669 | 8/1978 | France . |
| 55-55063 | 4/1980 | Japan . |
| 57-144175 | 6/1982 | Japan . |
| 850284 | 7/1985 | PCT Int'l Appl. . |
| 170900 | 10/1934 | Switzerland . |
| 3500200 | 12/1960 | Switzerland . |
| 223515 | 10/1924 | United Kingdom . |
| 1604615 | 12/1981 | United Kingdom . |
| 2104015 | 3/1983 | United Kingdom . |

(List continued on next page.)

OTHER PUBLICATIONS eral Catalogue", published in Austrailia in 1979, p. 841.

Caterpillar, "CAT Challenger 65", December 1986, (brochure).

Mike Osenga, "Caterpillar's New Rubber-Tracked Farm Tractor", Mar. 1987, pp. 25-26, from Diesel Progress North American (magazine).

Brendan M. Greeley, Jr., "Caterpillar, Martin Marietta Roll Out Prototype Hard Mobile ICBM Launcher", 9/16/85, pp. 24-25, Aviation Week & Space Technology.

Photograph of track Caterpillar Tractor Co. to have been in public use as of Jan., 1981.

Caterpillar brochure, "CAT Challenger 65", Feb., 1987, 10 pages.

Caterpillar brochure (undated), entitled "CAT Challenger 65 The Total Field Machine", 12 pages.

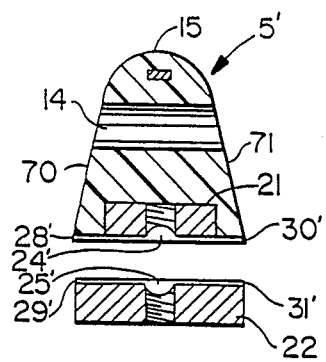
Fig. 14
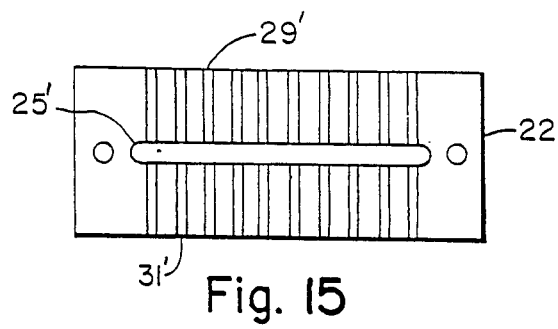
Fig. 15
Fig. 16
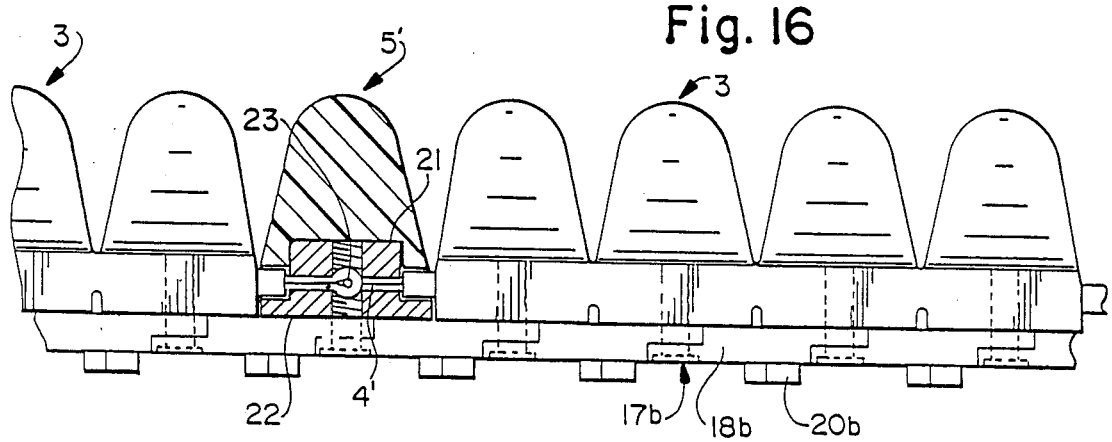
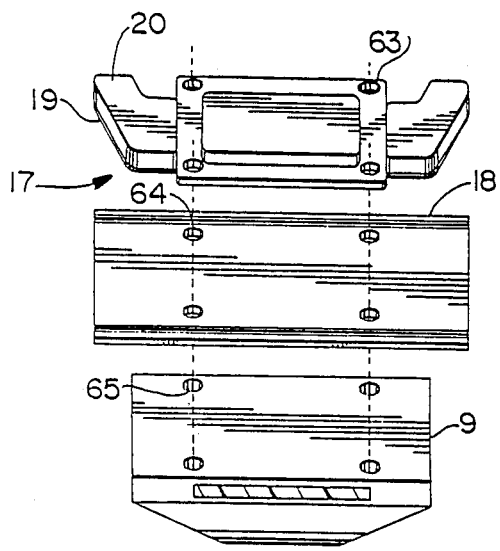
Fig. 18
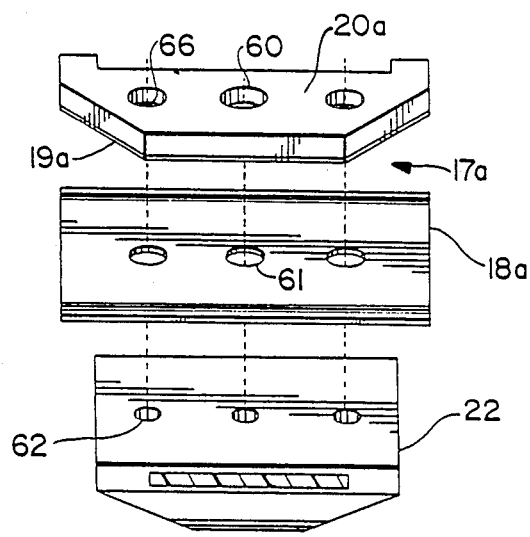
Fig. 17

ENDLESS DRIVE TRACK JOINT ASSEMBLY

This application is a continuation-in-part of U.S. Applications Ser. Nos. 113,670; 049,819; and 051,830, filed Oct. 28, 1987, May 14, 1987 and May 20, 1987, respectively. The aforementioned three previously filed U.S. applications are fully incorporated herein by reference.

BACKGROUND OF THE INVENTION

The present invention relates to an endless track drive system, and particularly to an assembly for joining ends of a drive track utilized in an endless track drive system. Endless track drive systems are used on vehicles such as tractors, bulldozers and tanks.

Many efforts have been made to improve endless track drive systems. In Edwards U.S. Pat. No. 4,093,318, issued June 6, 1978 (fully incorporated herein by reference), an endless track drive system is disclosed and claimed which includes a plurality of endless track drive sections, each section having a substantially flat contact surface and sloped surfaces to distribute weight and shed dirt and other foreign objects. Although U.S. Pat. No. 4,093,318 represented a marked improvement in endless track drive systems existing prior to that time, the pivotal means of connecting the endless track drive sections was subject to excessive wear, and the endless track drive system there disclosed continued to be excessively difficult and time-consuming to make, install and repair. It was further found that dirt and foreign objects continued to interfere with proper operation of the endless track drive system, although again not to the extent of track drive systems existing prior thereto.

In further recent developmental work, Edwards and his partners/co-inventors Harper and McNew have further improved upon the endless track drive system disclosed in Edwards U.S. Pat. No. 4,093,318. Their U.S. Pat. Nos. 4,569,561 issued Feb. 11, 1986, and 4,616,883 issued Oct. 14, 1986 (both fully incorporated herein by reference), disclose and claim an endless track drive system made up of a number of drive sections interconnected by cable connector sections. As there disclosed, the drive sections have sloping sides with removable rubber wear pads, and the cable connector sections include cables encased in rubber or other similar suitable material. As a result of such features, the endless track drive system disclosed and claimed therein experiences improved flexibility and tensile strength, reduced noise, and reduced maintenance. The detrimental effects of dirt and debris are likewise mitigated.

Despite the marked improvement in endless track drive systems resulting from the recent work of Edwards, Harper and McNew, as represented in U.S. Pat. Nos. 4,569,561 and 4,616,883, there remained a need for simplification in the manufacture and use of even that improved endless track drive system. Furthermore, there remained a need for higher strength connector sections, since those disclosed in U.S. Pat. Nos. 4,569,561 and 4,616,883 experienced undue stress and fatigue at bolt and nut fasteners 38, 40 thereof.

SUMMARY OF THE INVENTION

Accordingly, the present invention has been developed to overcome the foregoing shortcomings of the prior most recent improved endless track drive system, and to provide an endless track drive system which has an improved construction, is stronger, simpler, less costly and less time-consuming to manufacture and use.

It is therefore an object of the present invention to provide a joint assembly for an endless track drive system which has increased strength.

It is yet another object of the present invention to provide a joint assembly for an endless track drive system which can be efficiently and economically manufactured.

Thus, in accordance with one aspect of the present invention the shortcomings of existing endless track drive systems are overcome by an endless drive track joint assembly comprising:

(a) at least one closed loop connector member situated within the endless drive track in such a way that two substantially parallel lengths of the connector member extend longitudinally of the endless drive track and loops of the connector member extend from ends of the endless drive track;

(b) a retaining rod situated between abutting ends of the endless drive track, connector member loops extending from the abutting ends being looped around the retaining rod;

(c) a master link with a one-piece upper part and a one-piece lower part, the upper and lower parts having cooperating recesses for receiving the retaining rod with the connector member loops therearound; and (d) means for fastening the upper and lower master link parts to one another to sandwich therebetween the retaining rod and the connector member loops.

In accordance with another aspect of the present invention, the endless drive track joint assembly comprises at least one connector member situated within the endless drive track in such a way that a plurality of substantially parallel connector member lengths extend longitudinally of the endless drive track and connector member loops extend from ends of the endless drive track.

In accordance with yet another aspect of the present invention, the endless drive track joint assembly includes two retaining rods situated between abutting ends of the endless drive track, at least one connector member loop extending from each abutting end being looped around a respective one of said retaining rods.

In accordance with still another aspect of the present invention, the connector member is made of steel or other high strength metal. In accordance with yet a further aspect of the present invention, the connector member is made of a light weight, high strength fabric.

In still a further aspect of the present invention, the fastening means is a threaded bolt received in corresponding threaded holes in the master link upper and lower parts.

In yet a further aspect of the present invention, the master link is formed as a drive member of the endless drive track.

In even a further aspect of the present invention, loops extending from abutting ends of the endless drive track are coated with polyurethane or similar material to protect against weather and debris.

These and other aspects and advantages of the present invention are described in or apparent from the following detailed description of the preferred embodiments.

BRIEF DESCRIPTION OF THE DRAWINGS

The preferred embodiments are described with reference to the drawings in which:

FIG. 14 is a longitudinal sectional view of a master link in accordance with another embodiment of the present invention;

FIG. 15 is a plan view of the lower base portion part of the master link of FIG. 14;

FIG. 16 is a longitudinal sectional view of the master link of FIG. 14 linking two adjacent drive modules equipped with connector members according to the present invention;

FIG. 17 is an exploded view of a master link base portion, removable backing plate and removable tread usable in the endless drive track joint assembly of the present invention;

FIG. 18 is an exploded view similar to FIG. 17 showing a drive module base portion, removable backing plate and removable tread;

DESCRIPTION OF THE PREFERRED EMBODIMENTS

Figure 1:
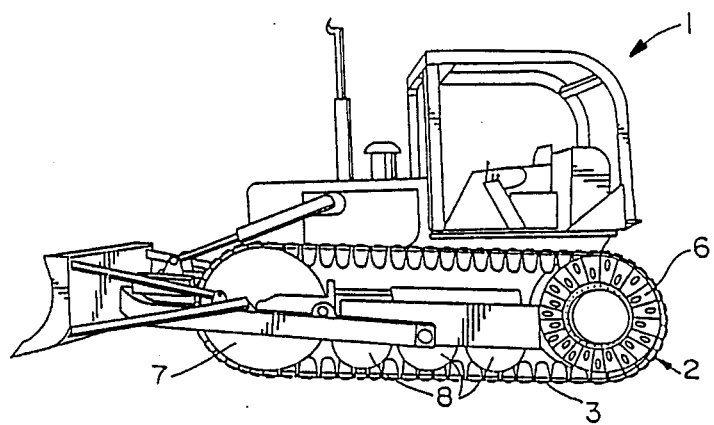
FIG. 1 is a perspective view of a bulldozer equipped with a modular endless track drive system.

FIG. 1 depicts a modular endless track drive system 2 installed on a bulldozer 1. FIG. 1 depicts only one modular endless track drive system, but it will be understood that the typical track vehicle is equipped with at least two such systems.

Each modular endless track drive system 2 is made up of a plurality of endless track drive modules 3 which are linked together by connector members 4 (FIGS. 3–5) fastened together by master links 5 (FIGS. 9–16) in a closed loop to form an endless track. The endless track drive system further includes the necessary drive wheels 6, and any necessary supporting wheels, such as opposite end wheels 7 and idler wheels or rollers 8. The modular endless track is installed so as to pass around the wheels 6, 7 and 8. The idler wheels 8 are irregularly spaced so as not to simultaneously engage like points on the endless track, thereby preventing undue vibrations. Of course, the track vehicle is further equipped with the necessary power source and controls to power the endless track drive system 2 and thereby propel the vehicle over varying terrain as desired.

Figure 2:
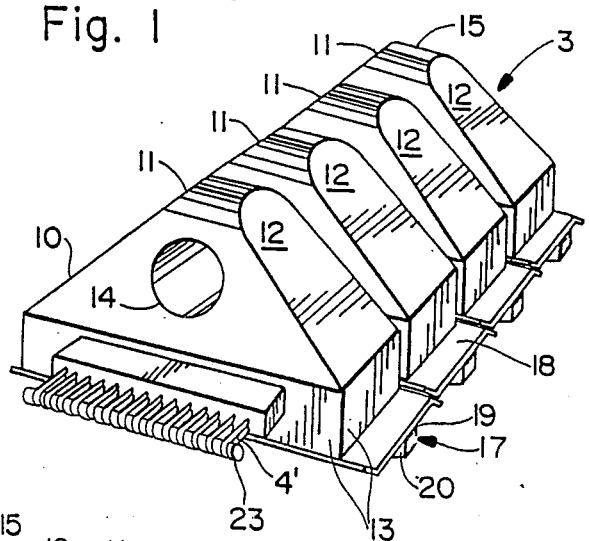
FIG. 2 is a perspective view of an endless track drive module with a connector member according to the present invention.
Figure 3:
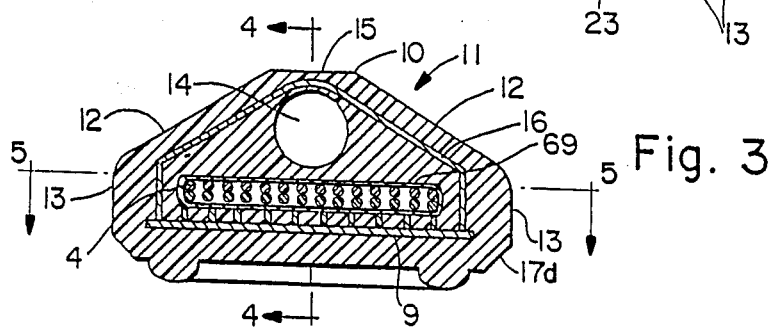
FIG. 3 is a transverse section view of the endless track drive module of FIG. 2 taken through one of the drive members thereof.
Figure 4:
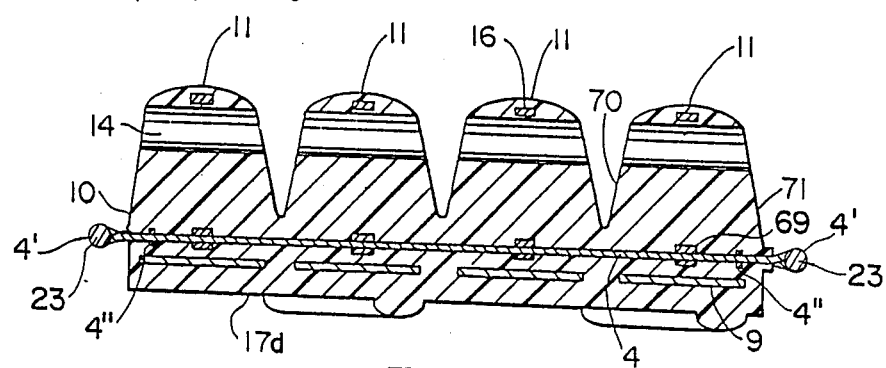
FIG. 4 is a longitudinal sectional view of the endless track drive module of FIG. 2 taken along the line 4—4 of FIG. 3.
Figure 5:
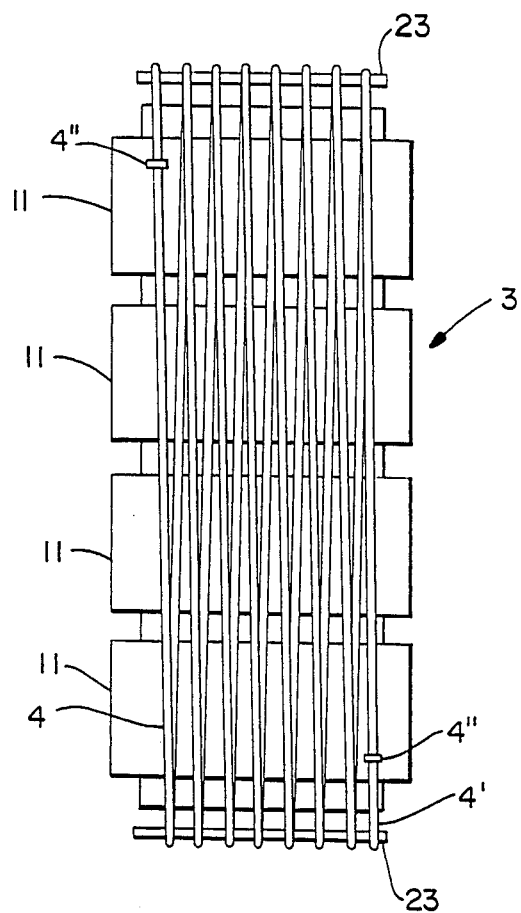
FIG. 5 is a sectional plan view of the endless track drive module of FIG. 2 taken along the line 5—5 of FIG. 3.

FIGS. 2–5 depict an endless track drive module 3 usable in the modular endless track drive system. Endless track drive module 3 optionally may include a plurality of base portions 9. The base portions 9 are preferably made of steel or other metal, but may be made of some other strong, rigid material. A polymeric structure 10 is molded onto base portions 9, or may be constructed in other ways with or without base portions 9. The polymeric structure 10 can be formed of any polymeric material which will provide a suitable frictional drive surface with limited operational noise; examples are rubber, polyurethane, or other plastics. As shown in FIGS. 2, 4 and 5, the polymeric structure 10 is formed into a plurality of drive members 11 equal in number to the number of base portions 9. Although FIGS. 2, 4 and 5 depict an endless track drive module with four drive members, the drive module can be formed of any number of drive members.

Figure 6:
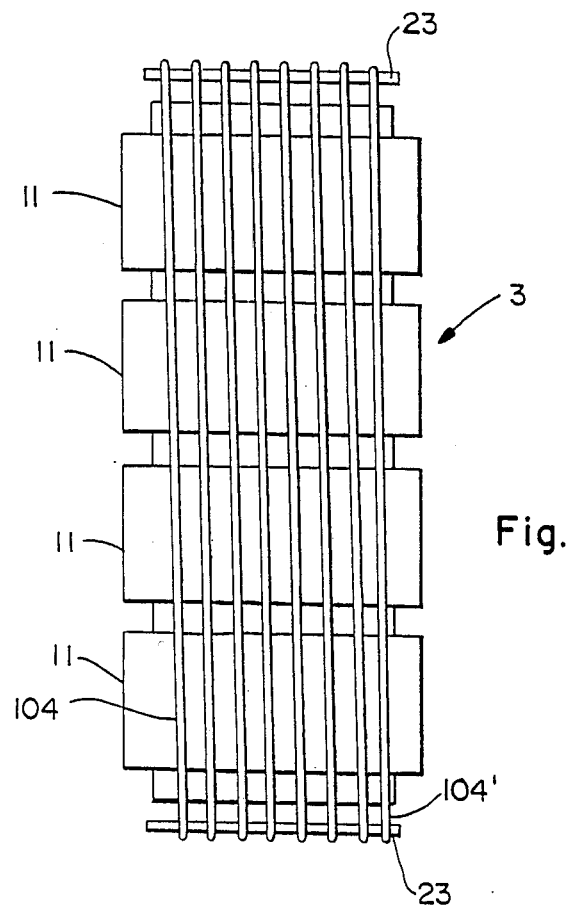
FIG. 6 is a sectional plan view of the endless track drive module of FIG. 2, taken along the same line as FIG. 5 but showing connector members in accordance with another embodiment of the present invention.
Figure 7:
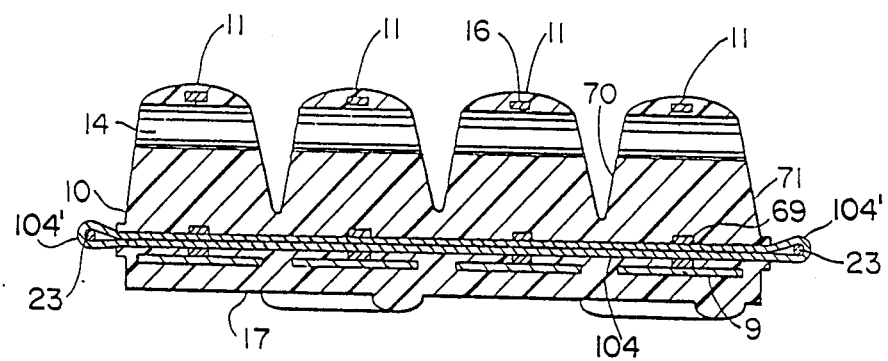
FIG. 7 is a longitudinal sectional view of the endless track drive module of FIG. 2, taken along the same line as FIG. 4 but showing a closed loop connector member in accordance with the embodiment of FIG. 6.
Figure 8:
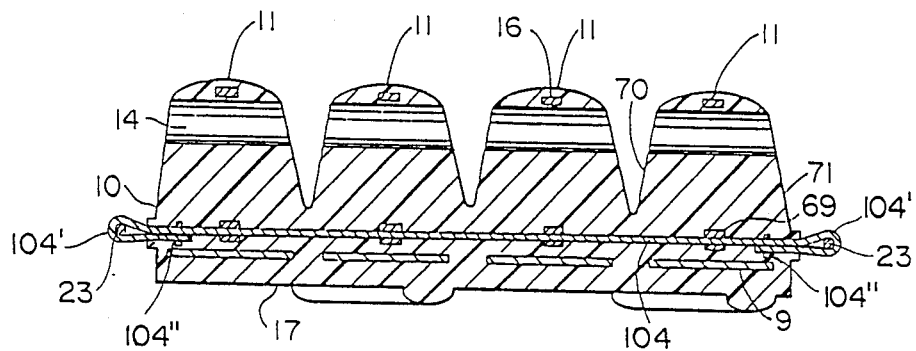
FIG. 8 is a longitudinal sectional view of the endless track drive module of FIG. 2, taken along the same line as FIG. 4 but showing a connector member of the embodiment of FIG. 6 with its ends fastened back to form loops.

Encased within the polymeric structure 10 is at least one connector member 4, the connector member 4 both reinforcing the endless track drive module 3 and providing the means by which adjacent drive modules can be joined together to form an endless track. The connector member 4 may be a cable made of steel or other high strength metal, or may be a high strength, light weight cord or fabric made of nylon, polyester or other materials. For example, connector member 4 may be constructed of DuPont's KEVLAR brand polyester armored material. As best shown in FIG. 5, connector member 4 is preferably continuously wound back and forth longitudinally of the endless track drive module in such a way as to provide a plurality of substantially parallel lengths of the connector member side-by-side within the endless drive track, with loops 4' extending from the ends of the endless track drive module. The ends of connector member 4 are fastened back against connector member 4 within the endless track drive module by means of appropriate fastening of crimping devices 4''. Alternatively, a plurality of connector members 104 with exposed loops 104' may be utilized as depicted in FIG. 6, each connector member 104 being constructed as a closed loop as shown in FIG. 7 or with the ends fastened back with appropriate fastening or crimping devices 104'' as shown in FIG. 8.

Although a certain number of connector member loops are depicted in FIGS. 2, 3, 5 and 6, it will be appreciated that any desired number of connector member loops may be utilized. It further will be appreciated that connector member 4, 104 must be suspended within polymeric structure 10 prior to the forming of polymeric structure 10 so that connector member 4, 104 may be substantially encased within polymeric structure. The loops 4', 104' of connector member 4, 104 are left exposed so as to be available for joining adjacent drive modules to form an endless track. The exposed loops 4', 104' may be coated with polyurethane or a similar material to protect them from weather and debris.

Figure 21:
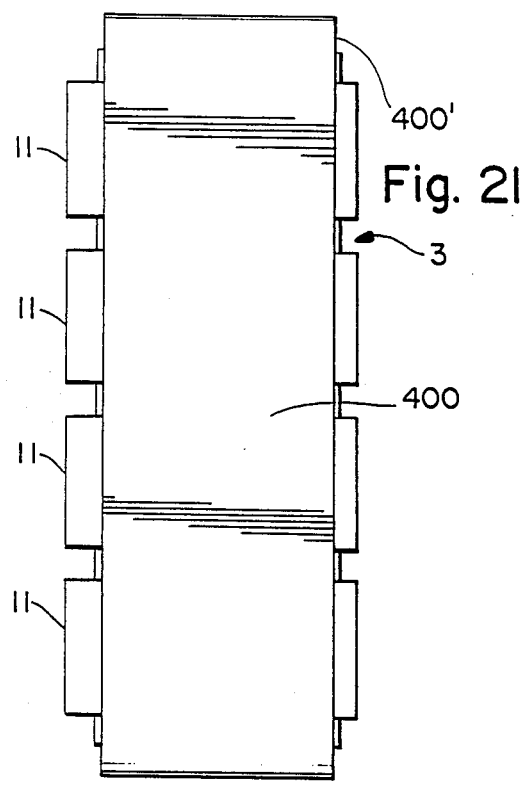
FIG. 21 is a sectional plan view of the endless track drive module of FIG. 19 taken along a line similar to FIG. 5.
Figure 22:
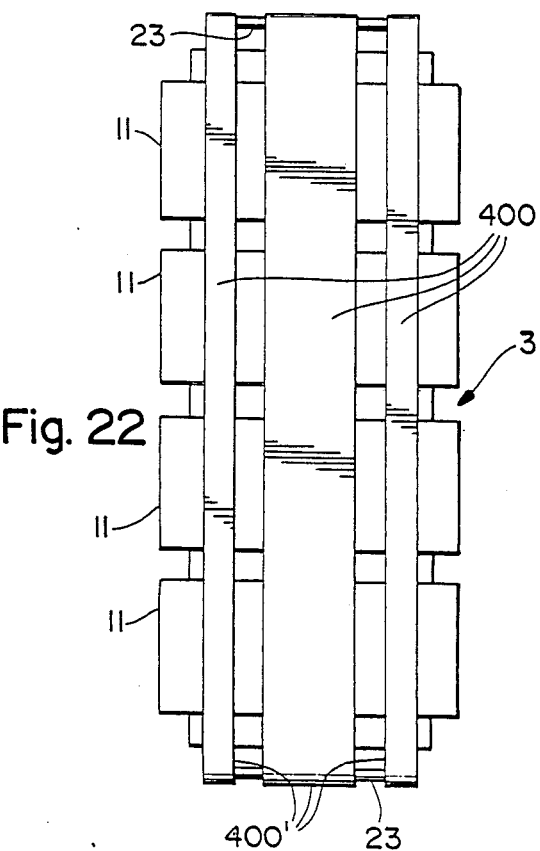
FIG. 22 is a sectional plan view of the endless track drive module of FIG. 19, similar to FIG. 21 but depicting a connector member according to yet a further embodiment of the present invention.
Figure 24:
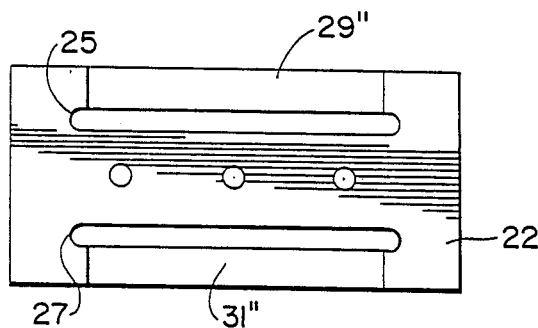
FIG. 24 is a plan view of a lower base portion part of a master link, similar to FIG. 11, but modified for use with the connector member depicted in FIGS. 19–23.

According to an alternative embodiment, as shown in FIGS. 19-24, a closed loop, high strength, light weight fabric belt type connector member 400 may be utilized in lieu of connector member 4 to reinforce the endless track drive module 3 and provide the means by which adjacent drive modules can be joined together to form an endless track. The connector member belt 400 is preferably made of high strength, light weight fabric made of nylon, polyester or other materials. As with connector member 4, connector member belt 400 may be constructed of Dupont's KEVLAR brand polyester armored material. Of course, as with connector member 4, connector member belt 400 alternatively may be made of steel or other high strength metal. Furthermore, a single connector member belt 400 may be utilized as depicted in FIG. 21, or a plurality of connector member belts 400 may be utilized as depicted in FIG. 22. In the latter case, the various connector member belts may be constructed of a single material, or some of the belts (such as, for example, the two narrower outer belts depicted in FIG. 22) may be made of a higher strength material.

It further will be appreciated that, like connector member 4, connector member belt(s) 400 must be suspended within polymeric structure 10 prior to the forming of polymeric structure 10 so that connector member belt(s) 400 may be substantially encased within the polymeric structure. Loops 400' are left extending from the ends of the endless track drive module, so as to be available for joining adjacent drive modules to form an endless track. As with exposed connector member loops 4', exposed connector member belt loops 400' may be coated with polyurethane or a similar material 400'' to protect them from weather and debris.

As depicted in FIGS. 2 and 3, each drive member 11 includes at least one drive face 12. Each drive member 11 is preferably formed with two lateral frictional drive faces 12 which slope inwardly from the respective base portion 9 toward one another with respect to a transverse direction of the endless track to form substantially an inverted V-shaped transverse cross-section. The angle of slope of such drive faces is preferably in the range of 30°-55° with respect to horizontal, and most preferably approximately 45°, but other angles of slope also may be chosen and drive members 11 may be provided with any suitable type, number and configuration of drive faces. For example, each drive member 11 could be provided with two lateral frictional drive faces which slope outwardly from a central portion of its respective base portion 9, thereby providing drive members 11 with concave V-shaped transverse cross-sections. Other configurations further will be understood from the above disclosure.

Drive members 11 also may be provided with vertically extending planar portions 13 below drive faces 12 so that externally directed portions will extend beyond the radial peripheries of wheels 6 and 7 thereby raising the track vehicle 1 higher above the terrain to further protect the structural mechanisms of the track vehicle from dirt and debris. Drive members 11 also may have front and rear edges (lateral drive face side edges) 70, 71 which are inwardly sloped with respect to a longitudinal direction of the endless track drive system so that such edges will lie substantially parallel to one another as they proceed around drive wheel 6 of the track vehicle, thereby providing smoother operation, permitting use of a sprocket, and further reducing influx of detrimental dirt and debris. The gaps between adjacent drive members and master links resulting from sloped edges 70 and 71 further permit dirt and debris to escape along straight runs of the endless track, and these gaps may vary in size without detriment to their dirt removal function.

To reduce the mass of drive modules 3, and also reduce consumption of polymeric material and consequent cost, one or more holes 14 optionally may be formed in each drive member. Furthermore, an additional upper drive surface 15 may be formed on each drive member for either frictional drive or sprocket drive by an axle of drive wheel 6. As viewed from a transverse perspective of the endless drive track (i.e., as per FIG. 3), the upper drive surface 15 is narrower at its uppermost point that it is further down toward the drive track (see FIG. 2), thus optimizing removal of dirt and debris. Additionally, a support structure 16 may be fastened to each base portion 9 by welding, screws, bolts or other fastening means in order to further reinforce drive members 11, render it easier to mold polymeric structure 10 onto base portions 9, and further secure base portions 9 to polymeric structure 10. An additional support structure 69 may also be provided for suspending connector member 4 above base portions 9 and further securing base portions 9 to polymeric structure 10. Support structures 16 and 69 may be in the form of metal straps, or may be made from a rigid plastic material or other suitable rigid substance. Support structure 16 is preferably shaped to conform with the desired configuration of drive faces 12, but may be shaped in other configurations to serve its intended purposes. Support structure 69 likewise may be configured in a number of ways other than as shown.

FIGS. 9-12 and 14-16 depict two embodiments of the master link which is used to join adjacent drive modules in order to form the endless track. As depicted, master links 5, 5' preferably have the same general configuration and construction as each individual drive member 11 of drive module 3, and like elements are identified with like reference numerals. However, the base portion of each master link has one-piece upper and lower parts 21, 22 which can be fastened together with a threaded bolt or other appropriate fastening means with connector member loops 4', 104', 400' sandwiched therebetween, thereby joining adjacent drive modules. Since the upper and lower master link base portion parts are each formed as a single piece, the ultimate stress is on the connector members rather than on the threaded bolt or other fastening means utilized to fasten the upper and lower master link base portion parts. Thus, although the upper and lower master link base portion parts could each be formed in multiple pieces interconnected in some fashion, it is preferable to form each of them as a single piece as shown.

Figure 9:
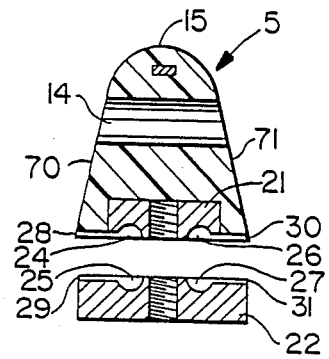
FIG. 9 is a longitudinal sectional view of a master link in accordance with the present invention.
Figure 10:
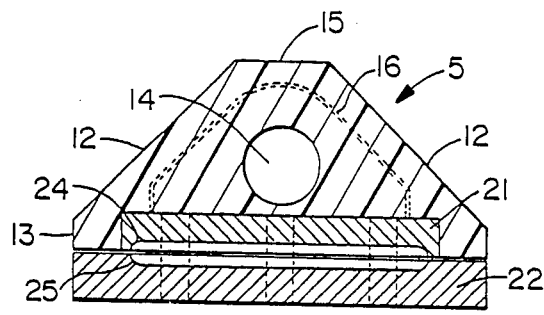
FIG. 10 is a transverse sectional view of the master link of FIG. 9.
Figure 11:
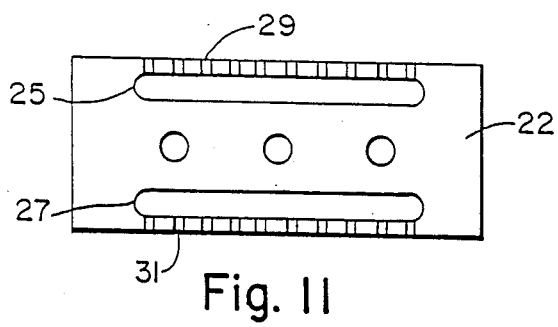
FIG. 11 is a plan view of the lower base portion part of the master link of FIG. 9.
Figure 12:
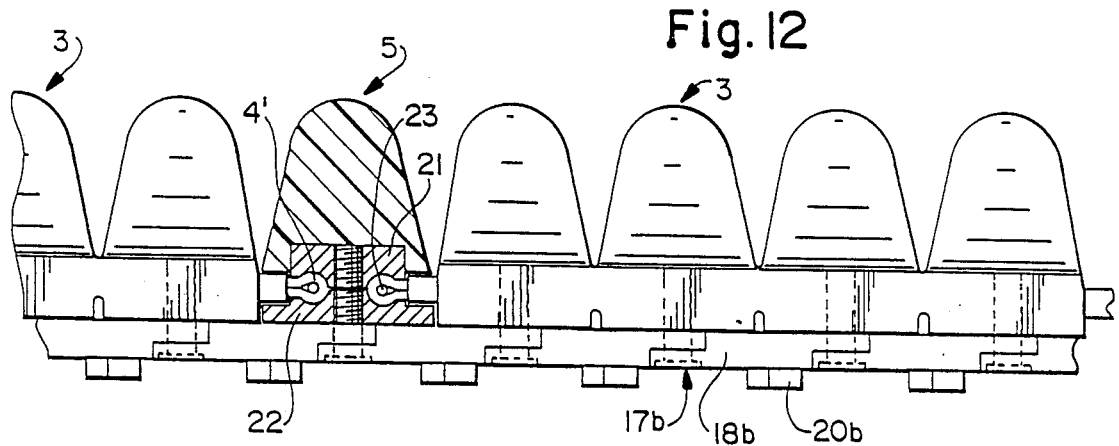
FIG. 12 is a longitudinal sectional view of the master link of FIG. 9 linking two adjacent drive modules equipped with connector members according to the present invention.

FIGS. 12 and 16 depict the master link fastened in place joining two adjacent drive modules 3 with exposed connector member loops 4'. Loops 4' are looped around retaining rod(s) 23. Retaining rod(s) 23 are made of steel or other high strength material, and may be circumferentially grooved as shown in FIGS. 2 and 4–8 so that each connector member loop may be looped around a respective retaining rod within a respective groove therein to thereby maintain lateral spacing of the loops. The upper and lower parts 21, 22 of the base portion of the master link are provided with cooperating recesses which together are of the same general configuration as the connector member loops 4' and retaining rod(s) 23 of abutting drive modules. Preferably, the connector member loops of abutting drive modules are looped respectively around two retaining rods, as shown in FIG. 12. In that case, the upper and lower master link base portion parts are provided with cooperating recesses 24–27 and channels 28–31 as shown in FIGS. 9–11. Alternatively, the connector member loops of abutting drive modules may be looped around a single retaining rod as shown in FIG. 16. In that case, the upper and lower master link base portion parts are provided with cooperating recesses 24', 25' and channels 28'–31', as shown in FIGS. 14 and 15. In either case, the recesses and channels must be sufficient to accommodate the connector member loops and retaining rod(s) of adjacent drive modules. Furthermore, in either case, compression on the connector member loops by the master link can be changed by simply changing the diameter of the retaining rod(s) utilized and without changing the size of the recesses and channels in the master link. Preferably, enough compression is placed on the connector member loops to keep out debris and prevent vibrational fraying of the connector member loops, while avoiding excessive compression which would result in strength reducing deformation and damage to the connector member loops.

If connector member belt(s) 400 (FIGS. 19–23) is utilized in lieu of connector member 4, the upper and lower master link base portion parts 21 and 22 must be slightly modified to accommodate the connector member belt(s). Thus, single wide channels equal in width to the overall width of the connector member belt(s) are substituted for channels 28–31 of the master link embodiment depicted in FIGS. 9–11. This is illustrated, by way of example, for the lower master link base portion part 22 in FIG. 24. As shown there, single wide channels 29'' and 31'' are substituted for channels 29 and 31 of the prior embodiment (compare to FIG. 11).

Figure 23:
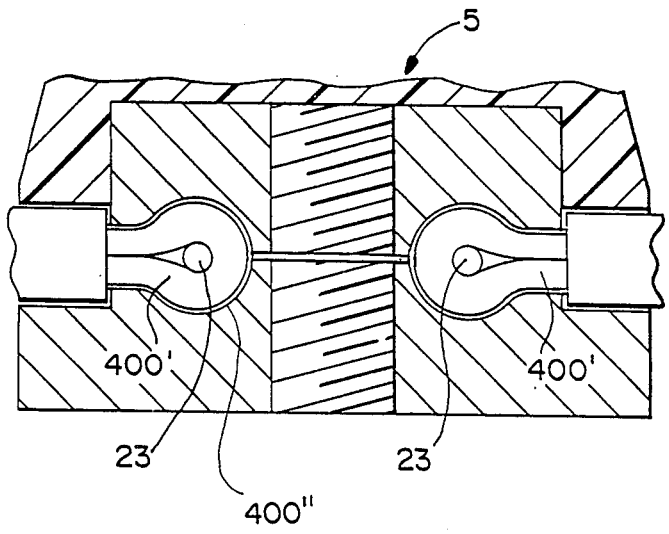
FIG. 23 is an enlarged longitudinal sectional view of a master link linking two adjacent drive modules equipped with a connector member as depicted in FIGS. 19–22.

Loops 400' of connector member belt(s) 400 are then looped around retaining rods 23, in the same manner as previously described with reference to connector members 4, as depicted in FIG. 23. As previously explained with regard to connector member 4, connector member loops of abutting drive modules preferably are looped respectively around two retaining rods as shown in FIG. 23, but may be looped around a single retaining rod in the same manner as described with reference to FIG. 16. Of course, in the latter case, a plurality of narrower width connector member belts would need to be utilized in each drive module, so that the connector member loops from abutting drive modules could be alternated on the single retaining rod. As also previously explained with regard to connector member 4, proper compression on the connector member belt loops by the master link is achieved by means of properly selected retaining rod(s) diameter.

Figure 13:
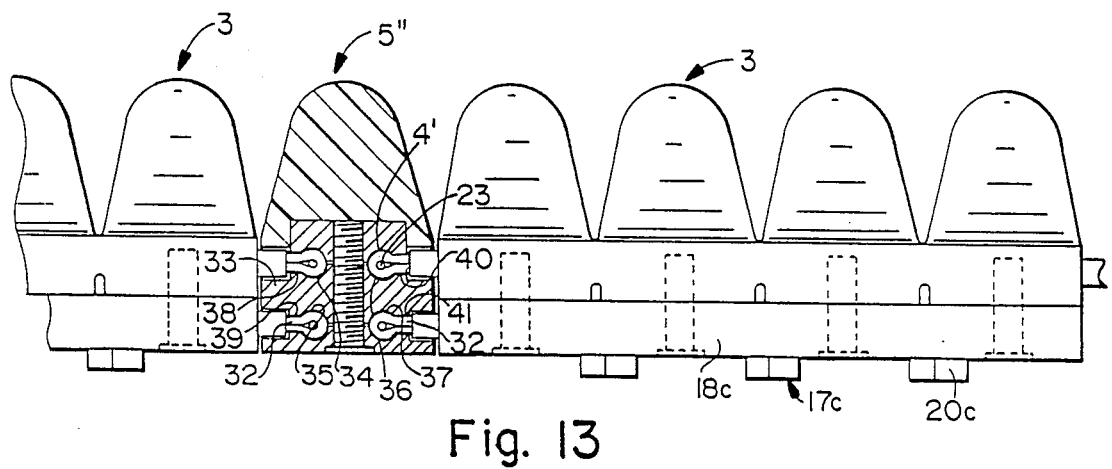
FIG. 13 is a longitudinal sectional view of a master link in accordance with another embodiment of the present invention linking two adjacent drive modules and two adjacent modular, reinforced removable tread members.
Figure 19:
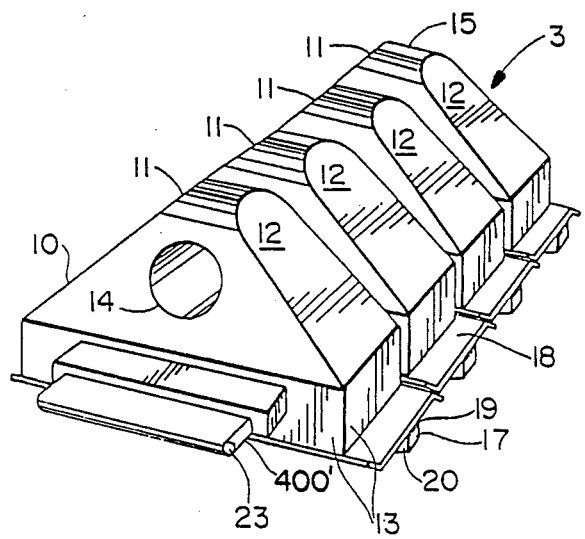
FIG. 19 is a perspective view of an endless track drive module similar to FIG. 2 but depicting a connector member according to a further embodiment of the present invention.
Figure 20:
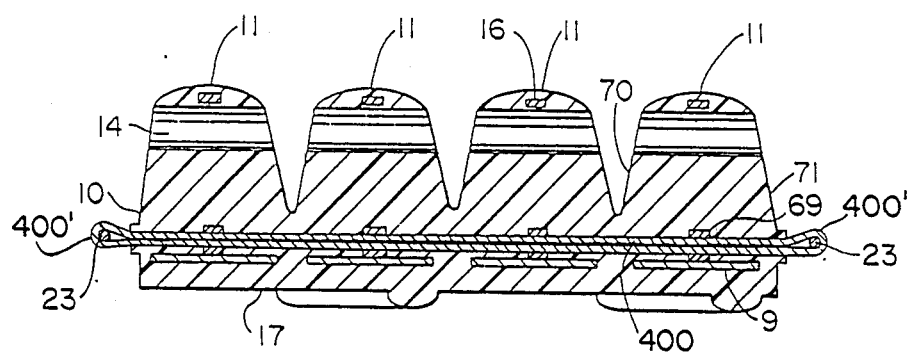
FIG. 20 is a longitudinal sectional view of the endless track drive module of FIG. 19 taken along a line similar to FIG. 4.

FIG. 13 depicts another master link 5'' which is adapted to accommodate additional connector members 32. These additional connector members are utilized to reinforce backing plates 18c of removable tread members 17c and to join adjacent removable tread members 17c. Master link 5'' has the same general configuration and construction as master links 5 and 5', but includes an intermediate base portion part 33. Intermediate part 33 contains additional recesses 34–37 and channels 38–41 corresponding respectively to recesses 24–27 and channels 28–31 of upper and lower base portion parts 21 and 22 depicted in FIGS. 9–11, 14 and 15. Accordingly, intermediate part 33 has sufficient recesses and channels to accommodate four rows of connector members and four retaining rods, two rows of connector members and two retaining rods from one drive module and its removable tread member and two rows of connector members and two retaining rods from an adjacent drive module and its removable tread member. Of course, master link 5'' alternatively could be configured, along the lines of FIGS. 14–16, to accommodate four rows of connector members with only two retaining rods.

As depicted in FIGS. 2 and 18, endless track drive module 3 also preferably includes removable tread members 17, each including a metal backing plate 18 and a polymeric tread 20 bonded to a metal supporting plate 19. Polymeric tread 20 may include a bias-ply, fiber reinforced layer. Individual treads and backing plates each preferably have four unthreaded holes 63 and 64, respectively, and are removably fastened to each of the base portions 9 of drive module 3 with suitable bolts or other fastening means received in threaded holes 65 of the base portions.

Master links 5, 5' and 5'' also preferably are equipped with removable tread members of slightly different configuration. As shown in FIG. 17, each master link tread member 17a includes a metal backing plate 18a and a polymeric tread 20a bonded to a metal supporting plate 19a, each preferably having three unthreaded holes 61, 60 and 66, respectively. The metal supporting plate 19a includes two outer holes 66 which are smaller than and concentric with the outer holes 60 in rubber tread 20a, such that the tread and backing plate can be removably fastened to lower master link base portion part 22 with suitable bolts or other fastening means received in two outer threaded holes 62 of the lower base portion part. The center holes of tread 20a, supporting plate 19a and backing plate 18a are all large enough that a suitable bolt or other fastening means can be passed therethrough and received in the center threaded hole 62 of lower master link base portion part 22. In this way, tread member 17a can be removed from the master link without completely disconnecting the upper and lower base portion parts of the master link.

FIG. 12 depicts another type of removable polymeric tread member 17b, including a polymeric tread 20b molded with a polymeric backing plate 18b. Backing plate 18b dovetails with adjacent tread member backing plates, the ends of adjacent tread member backing plates being fastenable together with bolts or other fastening means into the base portion of a given drive member 11 or master link 5. Backing plates 18b and treads 20b can be bias-ply, fiber reinforced as described above relative to polymeric treads 20. FIG. 13 depicts another removable tread member 17c, including a polymeric tread 20c molded with a polymeric backing plate 18c which is reinforced with cable or fabric and equal in length to the length of a given drive module.

Alternatively, as depicted in FIGS. 3 and 4, endless track drive module 3 and master links 5, 5', 4" may include polymeric tread members 17d which are integrally molded or otherwise integrally formed therewith, or which are permanently bonded thereto with adhesive or other bonding agent. These tread members also may be reinforced with cables, fabric or bias-ply, fiber reinforcement layers, as described above with regard to the removable tread members. Of course, metal treads could also be utilized, or metal backing plates could be provided with metal grouser bars. The type of tread and backing plate to be utilized, and the material of the chosen tread and backing plate, whether rubber, metal, polyurethane or other material, are functions of the type of terrain over which the endless track drive vehicle is to be utilized, and are left to operator discretion.

Obviously, many modifications and variations to the disclosed endless drive track joint assembly are possible in light of the above teachings. Furthermore, the endless drive track joint assembly may be utilized in conjunction with the drive wheels, sprockets, scrapers, and alternatively master links and removable tread members disclosed in copending U.S. Application Ser. Nos. 049,819; 051,830; and 113,670, and further may be utilized in conjunction with the making, installing, repairing and retrofitting methods disclosed therein. These additional aspects of the foregoing copending U.S. applications are fully incorporated herein by reference. Finally, it is to be understood that, within the scope of the appended claims, the invention may be practiced otherwise than as specifically described. For example, the various aspects of the invention may be selected for combination in a number of permutations other than those shown and described.

Thus, while only certain embodiments of the invention have been specifically described herein, it will be apparent that numerous modifications may made thereto without departing from the spirit and scope of the invention.

What is claimed is:

1. A joint assembly for an endless drive track, comprising:
   at least one closed loop connector member situated within said endless drive track in such a way that two substantially parallel lengths of said connector member extend longitudinally of said endless drive track and loops of said connector member extend from longitudinal ends of said endless drive track;
   a retaining rod situated between abutting longitudinal ends of said endless drive track, connector member loops extending from said abutting longitudinal ends being looped around said retaining rod;
   a master link with a one-piece upper part and a one-piece lower part, said upper and lower parts having cooperating recesses for receiving said retaining rod with said connector member loops therearound; and
   means for fastening said upper and lower master link parts to one another to sandwich therebetween said retaining rod and said connector member loops.

2. The joint assembly of claim 1, said at least one connector member being a high strength fabric belt.

3. The joint assembly of claim 2, said fabric being polyester.

4. The joint assembly of claim 1, said extending loops of said connector member being coated with polyurethane.

5. The joint assembly of claim 1, said at least one connector member comprising a relatively wide high strength fabric belt situated between two relatively narrow high strength fabric belts.

6. The joint assembly of claim 5, said relatively wide belt being made of a polyester fabric and said relatively narrow belts being made or a fabric which is stronger than said polyester fabric.

7. The joint assembly of claim 1, said at least one connector member being made of steel.

8. The joint assembly of claim 1, said master link being formed as a drive member of said endless drive track.

9. The joint assembly of claim 1, said fastening means comprising at least one threaded bolt received in corresponding holes in said master link upper and lower parts.

10. The joint assembly of claim 1, said master link including a tread member which is similar to other tread members on said endless drive track.

11. A joint assembly for an endless drive track, comprising:
   at least one closed loop connector member situated within said endless drive track in such a way that two substantially parallel lengths of said connector member extend longitudinally of said endless drive track and loops of said connector member extend from longitudinal ends of said endless drive track;
   two retaining rods situated between abutting longitudinal ends of said endless drive track, at least one connector member loop extending from each abutting longitudinal end being looped around a respective one of said retaining rods;
   a master link with a one-piece upper part and a one-piece lower part, said upper and lower parts having cooperation recesses for receiving said retaining rods with said connector member loops therearound; and
   means for fastening said upper and lower master link parts to one another to sandwich therebetween said retaining rods and said connector member. loops.

12. The joint assembly of claim 11, said at least one connector member being a high strength fabric belt.

13. The joint assembly of claim 12, said fabric being polyester.

14. The joint assembly of claim 11, said extending loops of said connector member being coated with polyurethane.

15. The joint assembly of claim 11, said at least one connector member comprising a relatively wide high strength fabric belt situated between two relatively narrow high strength fabric belts.

16. The joint assembly of claim 15, said relatively wide belt being made of a polyester fabric and said relatively narrow belts being made of a fabric which is stronger than said polyester fabric.

17. The joint assembly of claim 11, said at least one connector member being made of steel.

18. The joint assembly of claim 11, said master link being formed as a drive member of said endless drive track.

19. The joint assembly of claim 11, said fastening means comprising at least one threaded bolt received in corresponding holes in said master link upper and lower parts.

20. The joint assembly of claim 11, said master link including a tread member which is similar to other tread members on said endless drive track.

21. A joint assembly for an endless drive track, comprising:
- at least one connector member situated within said endless drive track in such a way that a plurality of substantially parallel connector member lengths extend longitudinally of said endless drive track and connector member loops extend from longitudinal ends of said endless drive track;
- a retaining rod situated between abutting longitudinal ends of said endless drive track, connector member loops extending from said abutting longitudinal ends being looped around said retaining rod;
- a master link with a one-piece upper part and a one-piece lower part, said upper and lower parts having cooperating recesses for receiving said retaining rod with said connector member loops therearound; and
- means for fastening said upper and lower master link parts to one another to sandwich therebetween said retaining rod and said connector member loops.

22. A joint assembly for an endless drive track, comprising:
- at least one connector member situated within said endless drive track in such a way that plurality of substantially parallel connector member lengths extend longitudinally of said endless drive track and connector member loops extend from longitudinal ends of said endless drive track;
- two retaining rods situated between abutting longitudinal ends of said endless drive track, connector member loops extending from each abutting longitudinal end being looped around a respective one of said retaining rods;
- a master link with a one-piece upper part and a one-piece lower part, said upper and lower parts having cooperating recesses for receiving said retaining rods with said connector member loops therearound; and
- means for fastening said upper and lower master link parts to one another to sandwich therebetween said retaining rods and said connector member loops.

23. The joint assembly of claim 22, said at least one connector member being a steel cable.

24. The joint assembly of claim 22, said at least one connector member being a high strength fabric.

25. The joint assembly of claim 24, said fabric being polyester.

26. The joint assembly of claim 22, said two retaining rods being circumferentially grooved, each of said connector member loops being looped around a respective retaining rod within a respective groove therein to thereby maintain lateral spacing of said loops.

27. The joint assembly of claim 22, comprising one continuous connector member wound back and forth longitudinally of the endless track drive module.

28. The joint assembly of claim 22, comprising a plurality of closed loop connector members.

29. The joint assembly of claim 22, comprising a plurality of connector members, the ends of each connector member being fastened back upon said each connector member to form said connector member loops.

30. A joint assembly for an endless drive track, comprising:
- at least one connector member situated within said endless drive track in such a way that a plurality of substantially parallel connector member lengths extend longitudinally of said endless drive track and connector member loops extend from longitudinal ends of said endless drive track;
- two circumferentially grooved retaining rods situated between abutting longitudinal ends of said endless drive track, connector member loops extending from each abutting longitudinal end being looped around a respective one of said retaining rods within respective grooves therein to thereby maintain lateral spacing of said connector member loops;
- a master link with a one-piece upper part and a one-piece lower part, said upper and lower parts having cooperating recesses for receiving said retaining rods with said connector member loops therearound, said member link being formed as a drive member of said endless drive track; and
- means for fastening said upper and lower master link parts to one another to sandwich therebetween said retaining rods and said connector member loops.

* * * * *

UNITED STATES PATENT AND TRADEMARK OFFICE
CERTIFICATE OF CORRECTION

PATENT NO. : 4,844,560

DATED : July 4, 1989

INVENTOR(S) : John W. Edwards, Daniel R. Harper and Quinton B. McNew.

It is certified that error appears in the above-identified patent and that said Letters Patent is hereby corrected as shown below:

Col. 10, Claim 11, line 16, change "cooperation" to --cooperating--.

Col. 11, Claim 22, line 4, after "that" insert --a--.

Col. 12, Claim 27, line 3, change "track drive module" to --drive track--.

Col. 12, Claim 30, line 21, change "member" to --master--.

Signed and Sealed this

Sixteenth Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,844,560

DATED : July 4, 1989

INVENTOR(S) : John W. EDWARDS et al

It is certified that error appears in the above-identified patent and that said Letters Patent is hereby corrected as shown below:

Col. 10, claim 6, line 3, change "or" to --of--.

Signed and Sealed this

Tenth Day of September, 1991

*Attest:*

HARRY F. MANBECK, JR.

*Attesting Officer*     *Commissioner of Patents and Trademarks*